US008380605B2

(12) United States Patent
Bouchey et al.

(10) Patent No.: US 8,380,605 B2
(45) Date of Patent: Feb. 19, 2013

(54) SYSTEM AND METHOD FOR GENERATING CROSS-SECTIONAL VOLATILITY INDEX

(75) Inventors: Paul W. Bouchey, Mercer Island, WA (US); Hemambara Dasu Vadlamudi, Bothell, WA (US)

(73) Assignee: Parametric Portfolio Associates, LLC, Seattle, WA (US)

( * ) Notice: Subject to any disclaimer, the term of this patent is extended or adjusted under 35 U.S.C. 154(b) by 262 days.

(21) Appl. No.: 12/887,653

(22) Filed: Sep. 22, 2010

(65) Prior Publication Data

US 2012/0072369 A1 Mar. 22, 2012

(51) Int. Cl.
*G06Q 40/00* (2012.01)
(52) U.S. Cl. .......................................... 705/36 R; 705/35
(58) Field of Classification Search ...................... 705/35
See application file for complete search history.

(56) References Cited

U.S. PATENT DOCUMENTS

| | | | |
|---|---|---|---|
| 6,523,015 B1 * | 2/2003 | Bera et al. ....................... | 706/12 |
| 7,328,184 B1 | 2/2008 | Krause | |
| 7,620,577 B2 | 11/2009 | Arnott et al. | |
| 2004/0024695 A1 | 2/2004 | Melamed | |
| 2005/0090911 A1 | 4/2005 | Ingargiola et al. | |
| 2005/0102214 A1 | 5/2005 | Speth et al. | |
| 2008/0195553 A1 | 8/2008 | Umlauf | |
| 2009/0182684 A1 | 7/2009 | Shalen | |
| 2011/0307415 A1 * | 12/2011 | Martellini et al. ........... | 705/36 R |

FOREIGN PATENT DOCUMENTS

| | | |
|---|---|---|
| EP | 1178416 | 2/2002 |
| WO | WO2004/010247 | 1/2004 |
| WO | WO2005/041101 | 5/2005 |

OTHER PUBLICATIONS

Volatility forecasts, trading volume, and the ARCH versus option-implied volatility trade-off. Donaldson, Glen; Kamstra, Mark Federal Reserve Bank of Atlanta, Working Paper Series , 2004 , 6 , NA Mar. 22 , 2004.*
The Journal of Finance • vol. LXI, No. 1 • Feb. 2006 The Cross-Section of Volatility and Expected Returns Andrew Ang, Robert J. Hodrick, Yuhang Xing, and Xiaoyan Zhang.*
The Barra Newsletter, Autumn 2004.*
Gorman, Larry R., Sapra, Steven G., Weigand, Robert A.; The Role of Cross-Sectional Dispersion in Active Portfolio Management, (Apr. 1, 2010); Forthcoming in Investment Management and Financial Innovations. Available at SSRN: http://ssrn.com/abstract=1266225; 25 pgs.
Gorman, Larry R., Sapra, Steven G., Weigand, Robert A. The Cross-Sectional Dispersion of Stock Returns, Alpha and the Information Ratio, (Jan. 21, 2010); Journal of Investing, Forthcoming. Available at SSRN: http://ssrn.com/abstract=1444868; 37 pgs.

(Continued)

*Primary Examiner* — William Rankins
(74) *Attorney, Agent, or Firm* — Sampson & Associates, P.C.

(57) ABSTRACT

A computer implemented system and method for generating a cross-sectional volatility index includes identifying a population of assets having predetermined characteristics to form an index, and capturing market capitalization data for each of the assets in the index. Each asset in the index is weighted according to its market capitalization, and returns are captured for each asset over a predetermined period. The weightings and the returns for each asset are used to calculate the weighted return dispersion for the index over the predetermined period, to form an XSV Index, in which the XSV Index is a measure of discrepancy in volatility among the assets in the index during the period.

41 Claims, 14 Drawing Sheets

OTHER PUBLICATIONS

Yasenchak, Richard; Active management headwinds reverse course; (May 2009); pp. 1-13; Russell Research.

Global Cross-Sectional Volatility Has Risen Since 2007;(May 2009); Barra Research Bulletin; pp. 1-5.

Connor, Gregory and Li, Sheng; Market Dispersion and the Profitability of Hedge Funds, (Jan. 2009); Research Papers in Economics; pp. 1-35.

Yu, Wallace and Sharaiha, Yazid M.; Alpha budgeting-Cross-sectional dispersion decomposed, (2007); Journal of Asset Management 8, pp. 58-72.

Dibartolomeo, Dan; Applications of Portfolio Variety, (Jun. 2006); Northfield Research Publications;11 pgs.

Hwang, Soosung and Satchell, Steve; GARCH Model with Cross-sectional Volatility:GARCHX Models, (Dec. 2001); Financial Econometrics Research Centre; Working Papers Series WP01-16; 35 pgs.

Senechal, Edouard; The Challenges of Declining Cross-Sectional Volatility, (Autumn 2004); Barra Horizon Newsletter; 40 pgs.

Solnik, Bruno and Roulet, Jacques; Dispersion As Cross-Sectional Correlation, (Jan./Feb. 2000), Financial Analyst Journal; 20 pgs.

Jacob, Jai and Egger, Daniel; Emerging Markets: Return Dispersion and Portfolio Concentration, (Mar. 2010) Investment Research (Lazard Net.com); 11 pgs.

De Silva, Harindra; Sapra, Steven; and Thorley, Steven; Return Dispersion and Active Management; Financial Analysts Journal; Sep./Oct. 2001; pp. 29-42.

Ankrim, Ernest M.; and Ding, Zhuanxin; Cross-Sectional Volatility and Return Dispersion, Financial Analysts Journal, Sep./Oct. 2002; pp. 67-73.

Beinstein, Eric; Introducing the JPMorgan Cross Sectional Volatility Model & Report; Corporate Quantitative Research, Nov. 17, 2006; JPMorgan 2006; pp. 15-27.

DowJones Indexes, Glossary of Terms, 2006.

\* cited by examiner 46, 47

| Region | Size | Style | Sector |
|---|---|---|---|
| Global | Small Cap | Value | Technology |
| Global Ex. U.S. | Mid Cap | Growth | HealthCare |
| Global Ex. Japan | Large Cap | | Consumer Discretionary |
| Developed | | | Consumer Staples |
| Developed Ex. U.S. | | | Energy |
| U.S. | | | Materials & Processing |
| Emerging Markets | | | Producer Durables |
| | | | Financial Services |
| | | | Utilities |

80 — Region
81 — Size
82 — Style
83 — Sector

| | Global | Global 5th | Global 95th | median |
|---|---|---|---|---|
| | 84 | 85 | 86 | 87 | 88 |
| Technology | 0.06878 | 0.065043 | 0.165418 | 0.101026 |
| Health Care | 0.06149 | 0.054269 | 0.115291 | 0.076346 |
| Cons Disc | 0.072789 | 0.062361 | 0.148384 | 0.087559 |
| Cons Stap | 0.045083 | 0.044936 | 0.094292 | 0.061153 |
| Energy | 0.069956 | 0.043767 | 0.110772 | 0.063704 |
| Materials | 0.081289 | 0.064818 | 0.1429 | 0.089764 |
| Prod Dur | 0.067217 | 0.056275 | 0.125254 | 0.081662 |
| Financials | 0.067966 | 0.048635 | 0.140165 | 0.074293 |
| Utilities | 0.050938 | 0.04647 | 0.128253 | 0.069922 |

| 84 | 85 Global | 86 5th | 87 95th | 88 median |
|---|---|---|---|---|
| Global | 0.068324 | 0.060224 | 0.142223 | 0.085239 |
| Value | 0.071139 | 0.054491 | 0.134057 | 0.081266 |
| Growth | 0.06385 | 0.064223 | 0.154438 | 0.091816 |
| Large | 0.058368 | 0.047676 | 0.131282 | 0.071923 |
| Large Value | 0.063683 | 0.044268 | 0.11737 | 0.067804 |
| Large Growth | 0.050273 | 0.050732 | 0.135533 | 0.076922 |
| Small | 0.095879 | 0.09125 | 0.192461 | 0.123231 |
| Small Value | 0.096576 | 0.081998 | 0.17209 | 0.111602 |
| Small Growth | 0.09662 | 0.099035 | 0.218784 | 0.1314 |

Fig. 4D

SYSTEM AND METHOD FOR GENERATING CROSS-SECTIONAL VOLATILITY INDEX

BACKGROUND

1. Technical Field

This invention relates to financial analysis tools, and more particularly to a computer implemented system and method for generating cross-sectional volatility indexes for populations of investable assets.

2. Background Information

Throughout this application, various publications, patents and published patent applications are referred to by an identifying citation. The disclosures of the publications, patents and published patent applications referenced in this application are hereby incorporated by reference into the present disclosure.

A wide variety of systems and methods have been developed for analyzing risk and predicting performance of financial products, many of which attempt to consider volatility. For example, call and put options or futures contracts may be used to attempt to predict market volatility. In addition, volatility indexes or portfolios may be provided, e.g., which attempt to rebalance various components in order to maintain a predetermined level of risk or volatility. Still further, the concept of cross sectional volatility is known, and may be expressed as the standard deviation of the daily returns of all the stocks trading in the market.

Volatility is thus a well known concept, that is routinely considered when making investment decisions. However, none of the known approaches provides users, such as mutual fund managers and other financial professionals, with a quick and convenient tool and method for identifying specific populations of assets, such as those of specific regions, sectors, sizes, and/or styles, that may be relatively strong candidates for active rather than passive management.

Thus, a need exists for a system and method that addresses the aforementioned unresolved issues.

SUMMARY

In one aspect of the present invention, a computer implemented method of generating a cross-sectional volatility index includes identifying a population of assets having predetermined characteristics to form an index, and capturing market capitalization data for each of the assets in the index. Each asset in the index is weighted according to its market capitalization, and returns are captured for each asset over a predetermined period. The weightings and the returns for each asset are used to calculate the weighted return dispersion for the index over the predetermined period, to form an XSV Index, using the formula:

$$XVOL = \sqrt{\sum_i w_i (r_i - R)^2}$$

Where,
$w_i$=the capitalization weight of stock i,
$r_i$=the total return of stock i for the period for which XSV is calculated, $$R = \sum_i w_i r_i$$

wherein the XSV Index is a measure of discrepancy in volatility among the assets in the index during the period.

In another aspect of the invention, an article of manufacture for generating a cross-sectional volatility index includes a computer usable medium having an executable computer readable program code embodied therein. The computer readable program code is configured for implementing the foregoing aspect of the invention.

In still another aspect of the invention, a computer-implemented system for generating a cross-sectional volatility index includes a population identification (ID) module to identify a population of assets having predetermined characteristics to form an index. A capitalization module is configured to capture market capitalization data for each of the assets in the index, and to weight each asset in the index according to its market capitalization. A return module captures returns for each asset over a predetermined period. A cross-sectional volatility (XSV) module is configured to calculate the weighted return dispersion for the index over the predetermined period, using the weightings and the returns for each asset, to generate an XSV Index, using the formula:

$$XVOL = \sqrt{\sum_i w_i (r_i - R)^2}$$

Where,
$w_i$=the capitalization weight of stock i,
$r_i$=the total return of stock i for the period for which XSV is calculated, $$R = \sum_i w_i r_i$$

so that the XSV Index is a measure of discrepancy in volatility among the assets in the index during the period.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIGS. 4A-4D are diagrammatic representations embodiments of various table within the database of FIGS. 2-3;

DETAILED DESCRIPTION

Figure 1:
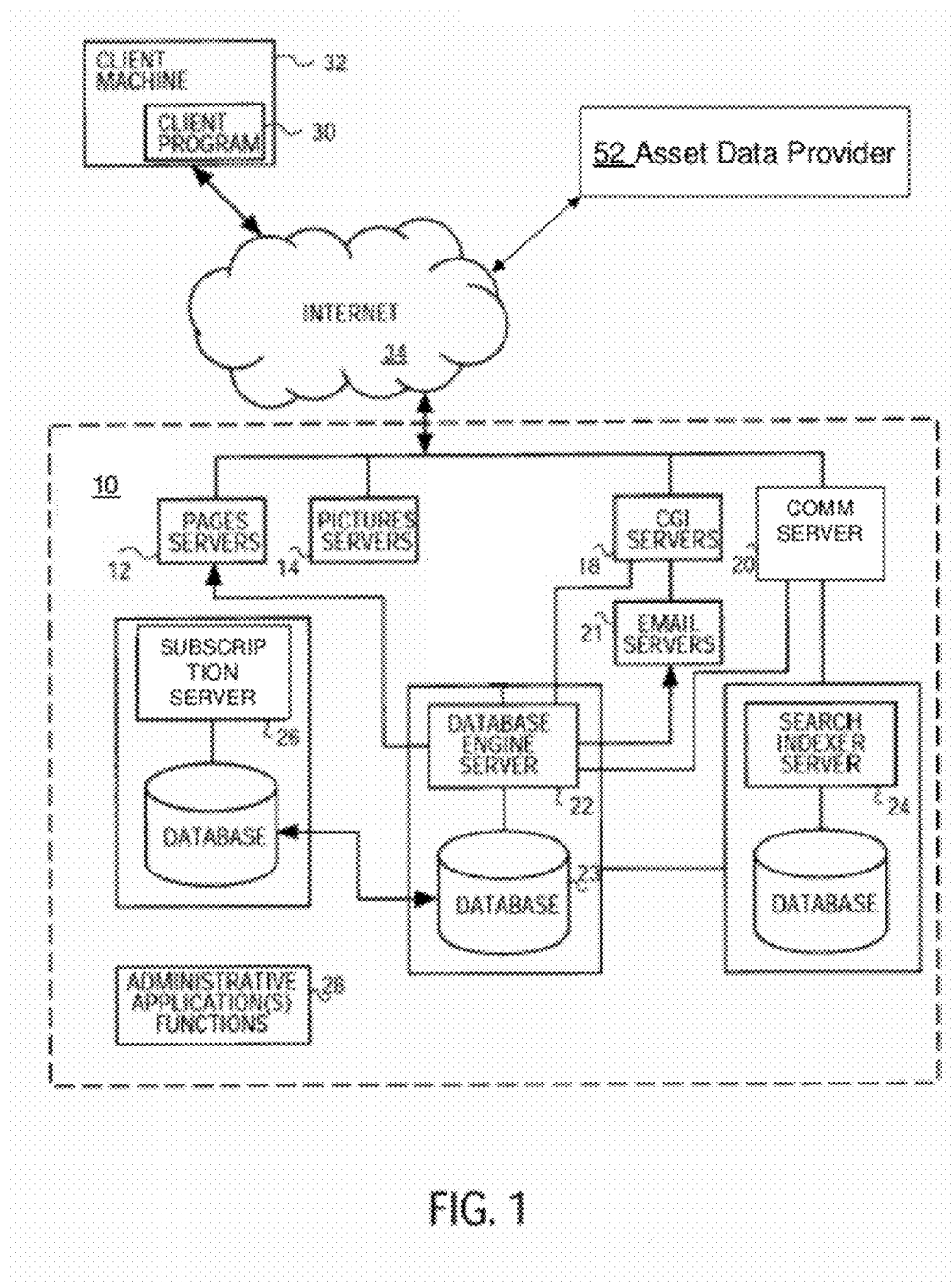
FIG. 1 is a block diagram of one embodiment of a network-based transaction facility in which aspects of the present invention may be practiced.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

A method and apparatus is provided for calculating cross sectional volatility using the historical daily returns of groups of capitalization-weighted stocks, to form a set of cross-sectional volatility (XSV) indexes. These XSV indexes may then be cross-referenced with one another to identify specific populations of assets that may represent opportunities for active versus passive financial management. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including the download of information/data and the like, by authorized users, such as via individual purchase and sale, or subscription.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "module", "engine" and the like are intended to refer to a computer-related component, including hardware, software, and/or software in execution. For example, a module may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Programming Languages

Systems and methods embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to FIGS. 1-11, embodiments of the present invention will be more thoroughly described.

Transaction Facility

FIG. 1 is a block diagram of a network-based transaction facility in the form of a Cross-Sectional Volatility (XSV) Index calculation facility 10 in accordance with aspects of the present invention. As shown, the XSV calculation facility 10 includes one or more of a number of types of front-end servers, namely page servers 12 that deliver web pages (e.g., markup language reports), picture servers 14 that dynamically deliver images (e.g., graphs, tables, charts, etc.) to be displayed within Web pages, CGI (Common Gateway Interface) servers 18 that provide an intelligent interface to the back-end of facility 10, and communication servers 20 that handle search and data requests to and from the facility 10. Optional e-mail servers 21 may provide, inter alia, automated e-mail communications to users of the facility 10. The back-end servers may include a database engine server 22, a search index server 24 and a subscription database server 26, each of which may maintain and facilitate access to a respective database. Facility 10 may also include an administrative application server 28 configured to provide various administrative functions.

The network-based XSV calculation facility 10 may be accessed by a client program 30, such as a browser (e.g., the Internet Explorer distributed by Microsoft) that executes on a client machine 32 and accesses the facility 10 via a network such as, for example, the Internet 34. Other examples of networks that a client may utilize to access the XSV calculation facility 10 include a wide area network (WAN), a local area network (LAN), a wireless network (e.g., a cellular network), or the Plain Old Telephone Service (POTS) network. The facility 10 may also use the network to capture data relating to investable assets from third party asset data providers 52.

Database Structure

Figure 2:
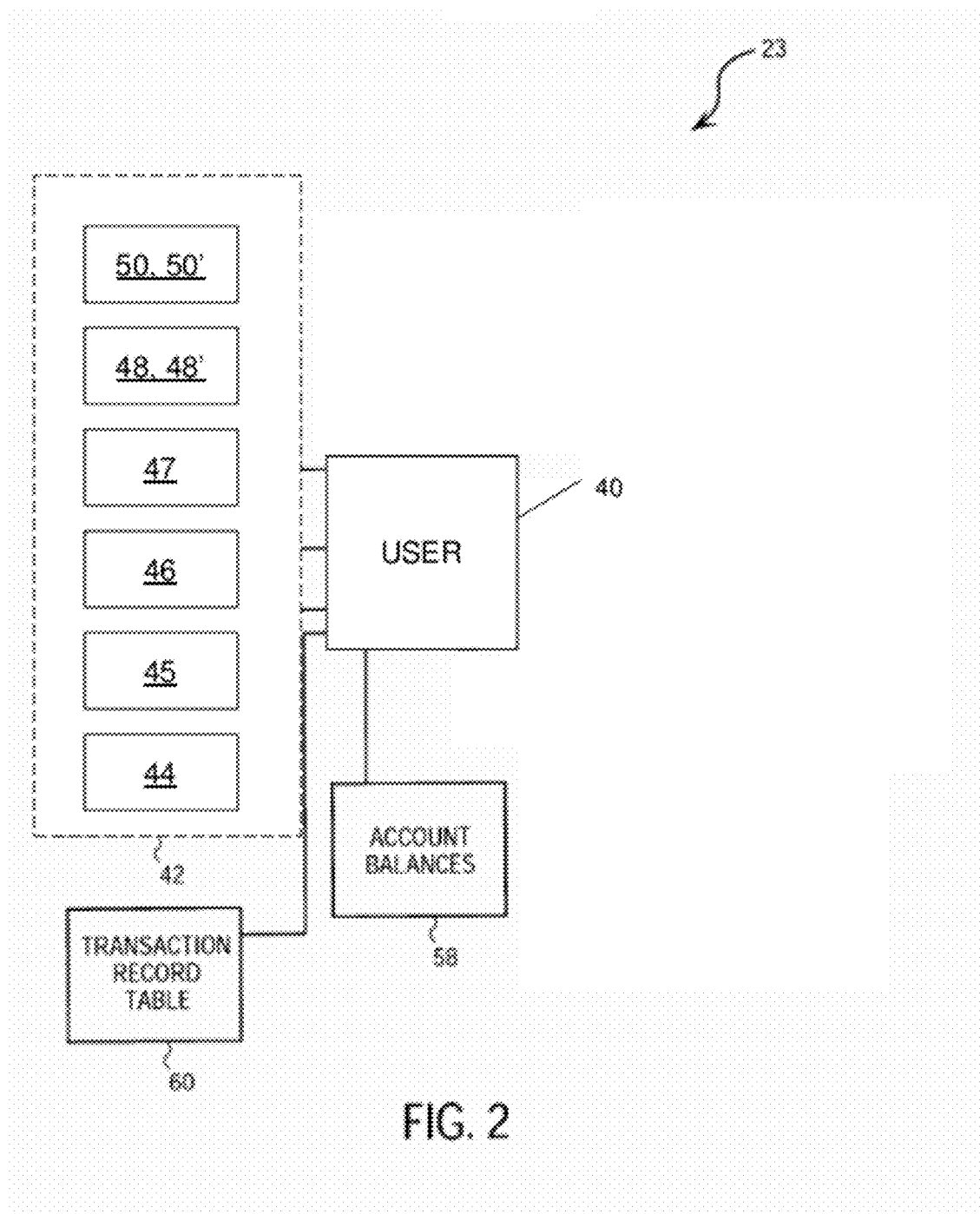
FIG. 2 is a block diagram of one embodiment of a database maintained by a database engine server of FIG. 1.

FIG. 2 is a database diagram illustrating an exemplary database 23, maintained by and accessed via the database engine server 22, which at least partially implements and supports embodiments of the XSV calculation facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

As shown, central to the database 23 is a user table 40, which contains a record for each authorized (e.g., subscribed) user of the XSV calculation facility 10. The database 23 also includes tables 42 that may be linked to the user table 40. Specifically, the tables 42 may include current source material (e.g., asset performance data) content table 44, source material archive table 45 for historical source data, category table 46, archival category table 47, current XSV tables 48, 48', and trailing average XSV tables 50, 50'. A user record in the user table 40 may be linked to some or all of the tables 42 to provide the user with limited or full access to the various XSV Indexes generated via the facility 10 and for which records exist within the report tables 42. As also shown, a number of other tables may be optionally linked to the user table 40, such as an account balances table 58 and a transaction record table 60.

Figure 3:
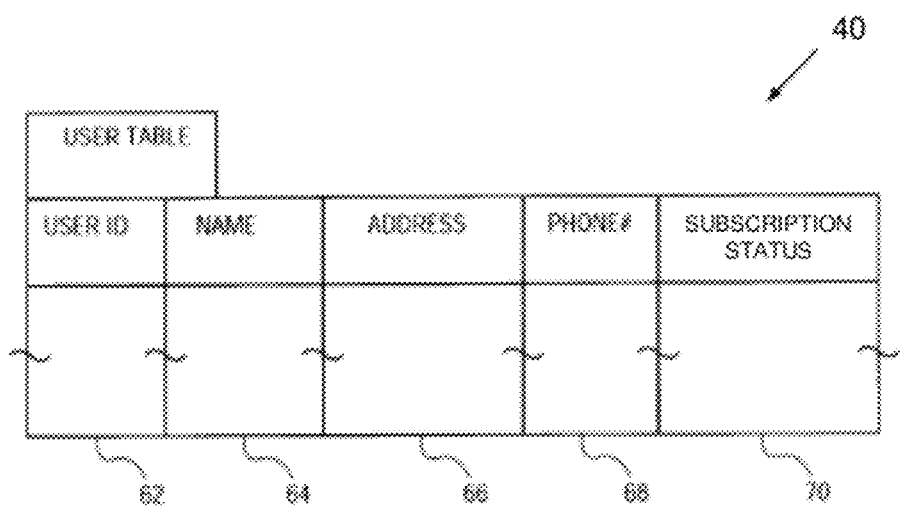
FIG. 3 is a diagrammatic representation of one embodiment of a user table within the database of FIG. 2.

FIG. 3 is a diagrammatic representation of an exemplary embodiment of the user table 40 that may be populated with records, or entries, for each user of the XSV calculation facility 10. As shown, table 40 includes a user identifier column 62 that stores a unique identifier for each user. A name column 64 may store a first name, a middle initial and a last name for each user. An address column 66 may store full address information and/or other contact information for each user, e.g. a street name and number, city, zip code, state, email address, etc. A phone number column 68 stores a home phone number for each user. A subscription status column 70 may store, for each user, a value identifying the user's subscription status. That is, different values may be assigned to indicate whether a user has a currently valid subscription, has an expired subscription (and which may provide for limited access to facility 10), and/or is accessing the facility on a pay-as-you-go basis such as via credit card, etc. It will be appreciated that any information other than that described above may populate the user table 40 without loss of generality.

Figure 4A:
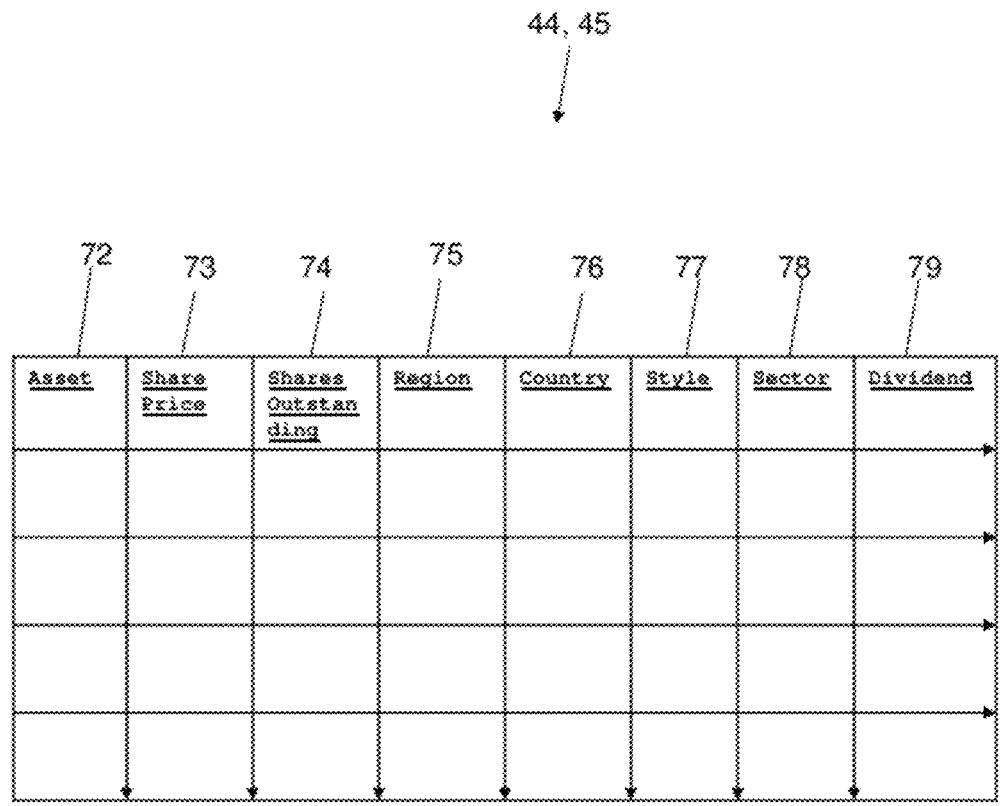

FIGS. 4A-4D are diagrammatic representations of exemplary embodiments of tables 44-50', which may be populated with data during use of the XSV calculation facility 10. Referring now to FIG. 4A, data table 44 is configured for being populated with source data that will be used to perform the XSV calculations. In particular embodiments, this source data includes the name (e.g., stock ticker) of the particular asset, the asset's share price, number of outstanding shares, region, country, style, sector, dividend yield, etc., and may be captured and populated into columns 72, 73, 74, 75, 76, 77, 78 and 79, respectively. Copies of this table populated with data from prior periods may be saved as archive tables 45.

Turning now to FIG. 4B, the assets of table 44 are sorted into populations/subpopulations to form Indexes based on various attributes, such as their region 80, size 81, style 82, sector 83, etc. As shown, each of these attributes (categories) may be further divided into any number of subdivisions. For example, the various regions may be sub-divided by cross-referencing to any of the size, style or sector categories. It should be recognized that the various categories and their sub-divisions may be based on substantially any categories commonly used in the investment industry to classify particular investable assets (e.g., stocks trading on exchanges such as the New York Stock Exchange (NYSE), NASDAQ, etc.) Moreover, any number of attributes may be cross-referenced to one another, to generate any number of subdivisions/Indexes.

Non-limiting examples of some of the categories and sub-divisions used to define the XSV Indexes of the present invention are shown in the fields of table 46. Information associated with each of the assets selected for the particular indexes may be linked from table 44, 45 to the various fields of table 46. Alternatively, the index fields of table 46 may each include their own respective linked data tables that may be populated with information relating to the applicable assets of tables 44, 45. It should be recognized that archive table 47 may be substantially similar to table 46, though populated with historical data, e.g., from prior days, months, years, etc. A more detailed, though not exhaustive listing of subdivisions/Indexes that may be used with embodiments of the present invention is shown in Example I hereinbelow.

Turning to FIG. 4C, a current XSV table 48 includes a population column 84, populated with various ones of the categories of table 46 (FIG. 4B). Table 48 may also include a sub-population XSV column 70, populatable with XSV calculations for the particular sub-divisions (Indexes), which include those assets common to both the categories of a particular row of column 84, and the heading of column 85. Thus, in the example shown, the XSV value for assets in the Global Technology XSV Index, is 0.06878, while the XSV value for the Global Utilities XSV Index is 0.050938. Optionally, additional XSV columns may be provided, to further subdivide the data of XSV column 85. For example, columns 86, 87 and 88 are populated with XSV data corresponding to the $5^{th}$ percentile, $95^{th}$ percentile, and median of the XSV values in column 85. An archive XSV table is substantially similar to table 48, but populated with historical data.

It should be recognized that column 84 may be populated with substantially any of the aforementioned categories. For example, as shown in FIG. 4D, column 84 of Table 48' is populated with regions and style categories 80, 82 (FIG. 4B). Column 85 may also be populated with XSV calculations for substantially any groupings of the asset categories of FIG. 4B, with columns 86, 87 and 88 populated with further subdivisions thereof. While as shown, column 85 is populated with XSV calculations for assets (e.g., Global) that are included in the categories of column 84, substantially any other subdivisions may be used. Similarly, columns 86, 87 and 88 may be populated with values other than the $5^{th}$ percentile, $95^{th}$ percentile, and median values as shown. An archive XSV table may be substantially similar to table 48', but populated with historical data.

It will be appreciated that other descriptive information may also populate the fields of the various tables described hereinabove.

XSV Index Generation Process

As mentioned hereinabove, embodiments of the present invention provide an automated system and method for generating Cross Sectional Volatility Indexes for a predetermined groups of stocks. Exemplary embodiments include selecting a group of stocks, such as the 1000 largest-capitalization stocks trading on the NY Stock Exchange, or an index such as the S&P 500®, Russell 2000®, etc.; weighting each stock in the group according to its market capitalization (i.e., generating a capitalization weight for each stock); tracking the daily returns (performance) of each stock on either a percentage change or value change basis; using the historical daily returns, and the weightings of each of the stocks, to calculate a cross-sectional volatility index.

The cross-sectional volatility index is a measure of how much discrepancy in volatility there was among the stocks in the index in a given period (e.g., day). (For example, a high cross-sectional volatility index would indicate that some stocks in the group were significantly more volatile than others in the group. A low cross-sectional volatility index would indicate the opposite, namely, that there was not a significant difference in volatility across the group.)

In particular embodiments, this stock-level volatility index may be generated for many different groups of stocks, and then cross-referenced to identify particular groups or sub-groups of stocks that may be of interest to mutual fund managers and advisors.

Fund managers, advisors, and the like, may then use these stock-level volatility indices to help determine where to focus in order to maximize returns. For example, an active fund manager whose performance is measured based on his ability to outperform a particular index (e.g., the S&P 500) may wish to avoid making individual stock picks in a sector or other group in which all of the stocks appear to be moving in lock-step with one another. Rather, the manager may look to groups having a high cross-sectional volatility, and then attempt to trade those stocks having higher individual volatility in order to realize gains that exceed those of the group as a whole.

While the embodiments herein are shown and described within the environment of the exemplary XSV calculation facility 10, it will readily be appreciated that the present invention may be used in any number of environments including network and on-line based transaction facilities in business-to-business, business-to-consumer, consumer-to-consumer applications, and/or stand-alone environments.

Figure 5:
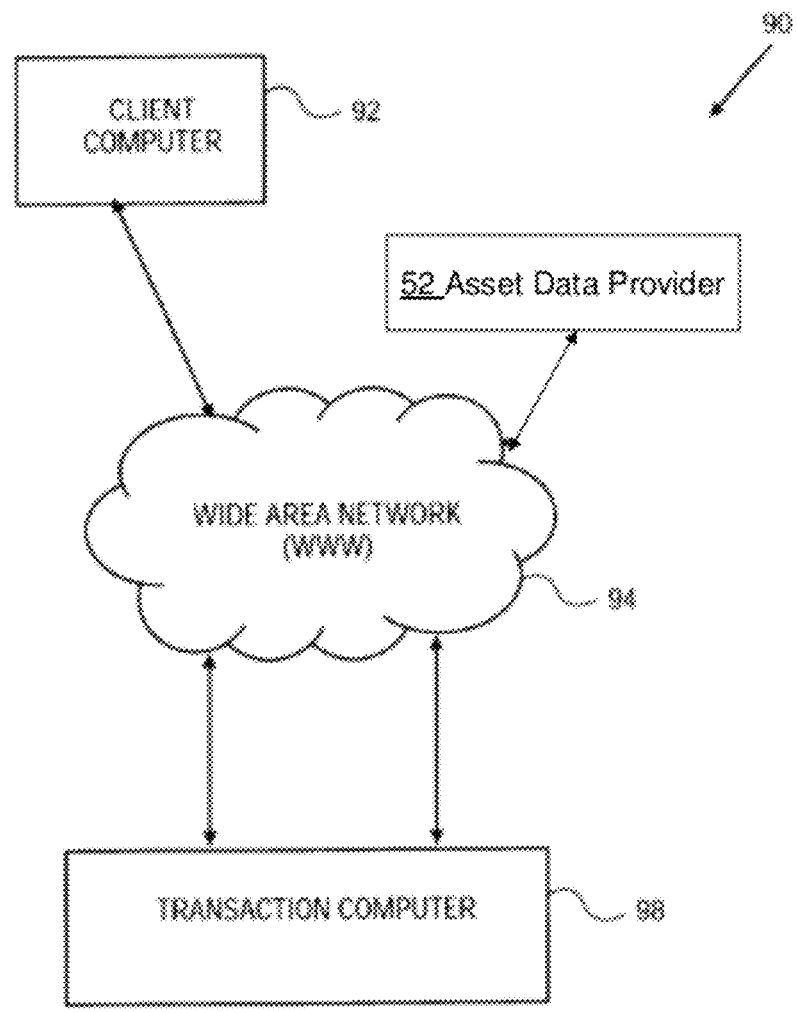
FIG. 5 is a block diagram of one embodiment of a system within which aspects of the invention may be embodied.

FIG. 5 is a simplified block diagram of a system 90 for generating XSV Indexes in accordance with an exemplary embodiment of the present invention. In this embodiment, a client computer 92 is coupled to a transaction computer 98 via a communications network (e.g. a wide area network) 94. The client computer 92 represents a device that allows a user to interact with the XSV calculation facility 10 or any other transaction facility 98. In one embodiment, the client computer 92 presents to the user an XSV Index display interface for searching/requesting XSV Index content within one or more of the aforementioned tables associated with the transaction computer 98.

The transaction computer 98, which supports a XSV calculation facility such as shown at 10 of FIG. 1, handles transactions between various participants of the facility 10 including the user of the client computer 92 and the provider 52 of raw asset data used in the XSV calculations. In one embodiment, the transaction computer 98 may initially receive the personal information of the participant from the client computer 92, and generate a subscription result which determines whether, and to what extent, the user is granted access to the facility 10. The transaction computer then facilitates the generation of XSV Index output in accordance with various user interfaces presented by the computer 98, via the client computer 92, to the user.

Figure 6:
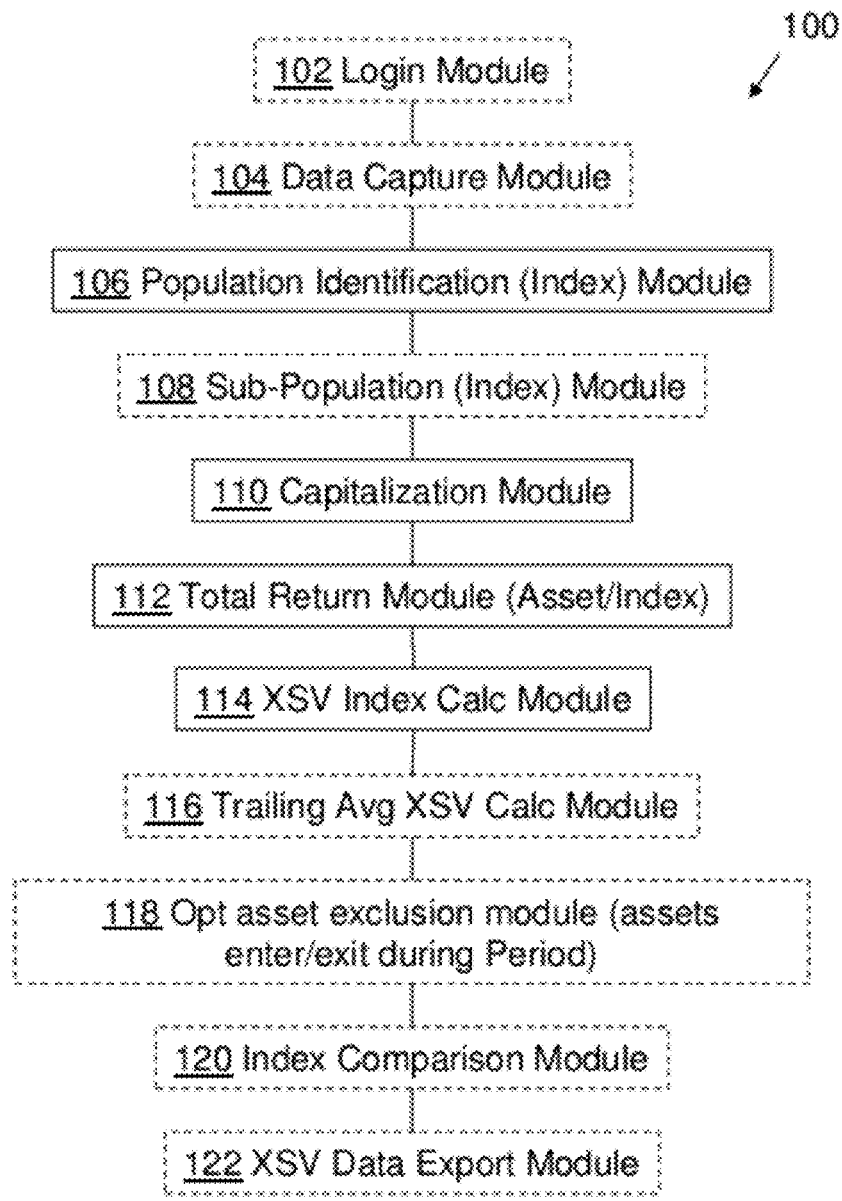
FIG. 6 is a block diagram of one embodiment of an XSV system of the present invention, with optional aspects shown in phantom.
Figure 8:
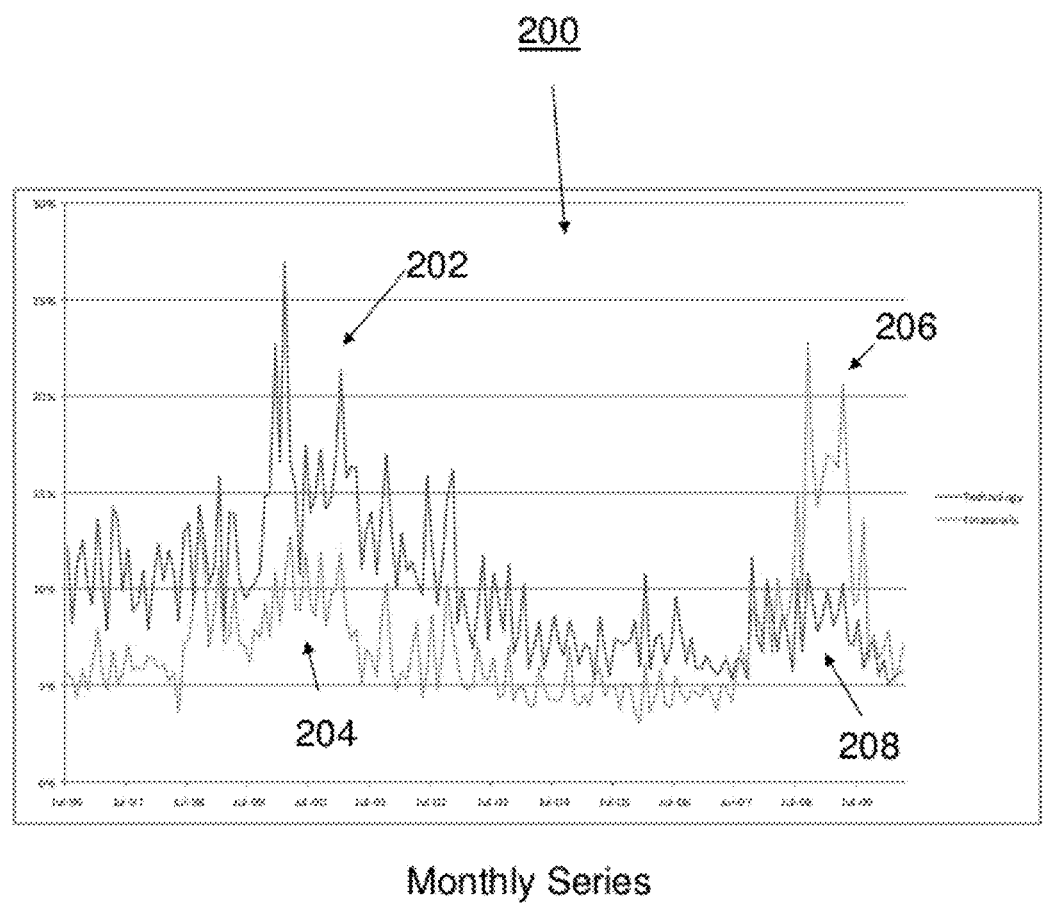
FIGS. 8-10 are exemplary representations of various displays generated by the embodiments of the present invention.
Figure 9:
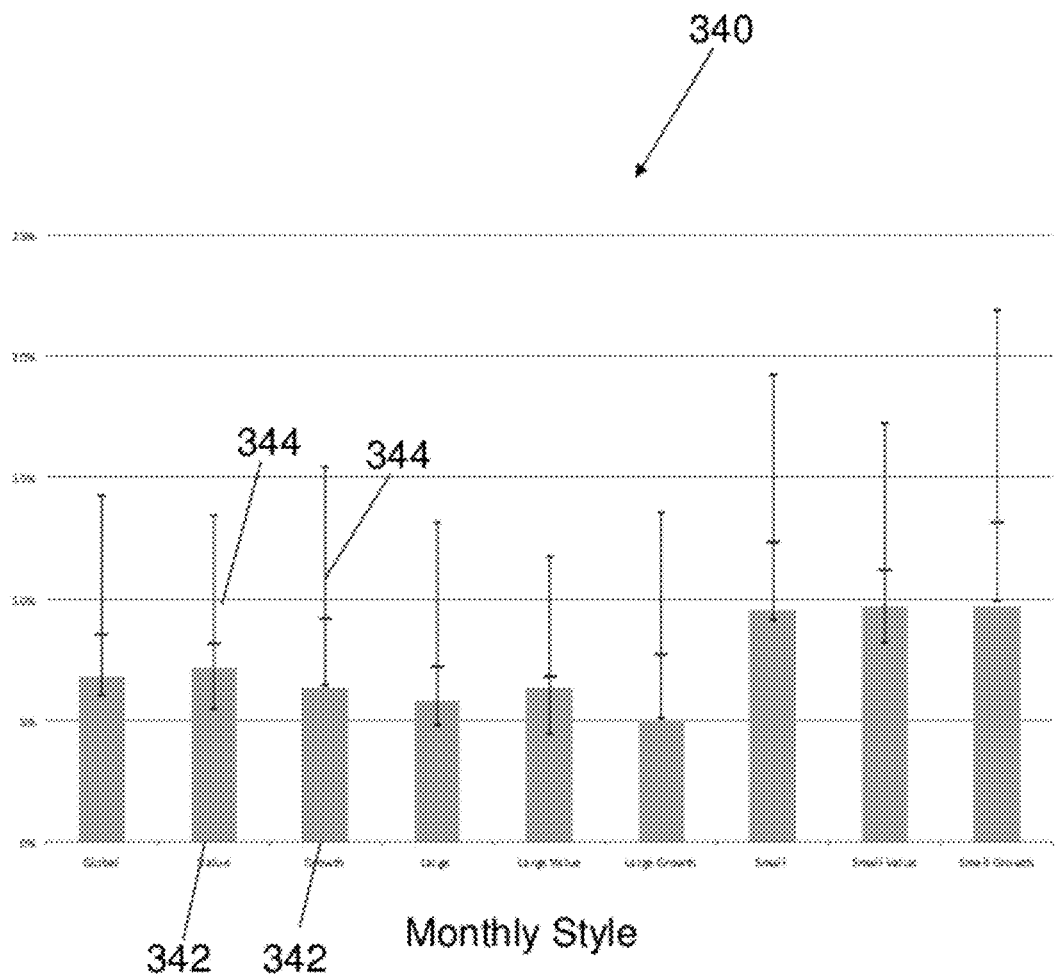
Figure 10:
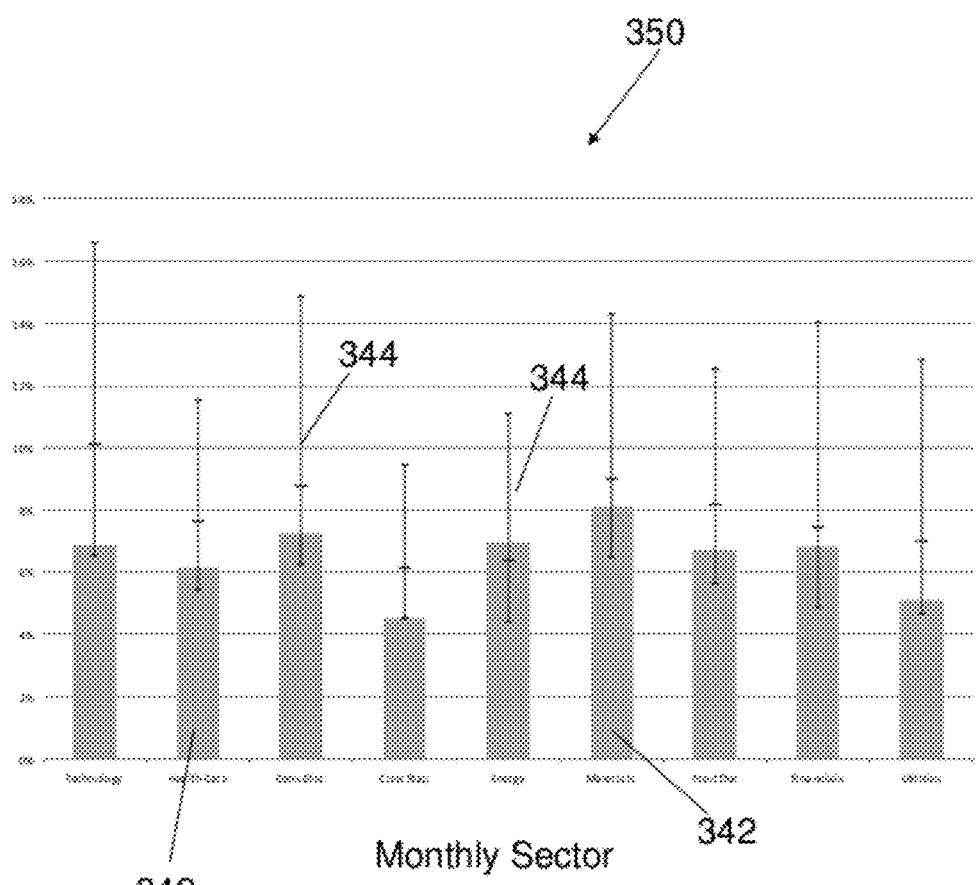

FIG. 6 shows a series 100 of modules, such as may take the form of a series of objects (or methods), that may be implemented by the XSV calculation facility 10, e.g., in combination with the various tables of database 23, for the purposes of generating one or more custom reports. The series 100 of modules shown in FIG. 6 will be described with reference to exemplary representations of the various interfaces as shown in FIGS. 8-10.

As shown, series 100 includes an optional login module 102, configured to generate a login interface through which a user of the facility 10 provides at least a user identifier and associated password. The user may also be requested to subscribe in order to gain access.

A data capture module 104 is configured to capture data for a broad universe of investable assets, including share price, the total number of outstanding shares, region, country, style, sector, and dividend payments, etc., from any number of third party asset data providers 52 (FIG. 5), as discussed above. This data may be imported using any convenient means, such as File Transfer Protocol (FTP) from a data provider 52 (FIG. 1), and used to populate tables 44, 45.

It should be noted that this data capture, and population of tables 44, 45 may be desirable in order to enable subsequent XSV calculation to be performed quickly and efficiently. However, use of module 104 is optional, as embodiments of the present invention may operate without this initial data capture/download, instead obtaining this information on an as-needed basis during XSV calculation.

A security identification (ID) module 106 is configured to identify a population of assets having predetermined characteristics, such as described hereinabove with respect to FIG. 4B and shown in tables 46, 47. The population(s) may be selected from among those downloaded to tables 44, 45, and may include, for example, such populations as the largest-capitalization stocks trading on a predetermined Stock Exchange; the S&P 500® index, the Russell 2000® index, the FTSE 100 Index, the EURO STOXX 50 Index, the Nikkei 225 Index, various other indexes, etc. The identified populations of assets (or pointers thereto) may then be entered into their respective fields in tables 46, 47. An optional sub-population module 108, as shown in phantom, may also be provided to further divide the populations identified by module 106, e.g., by cross-referencing the various populations (e.g., of tables 46, 47) to generate sub-populations of assets. The various populations and/or sub-populations define Indexes which may be listed in a table such as Example I hereinbelow.

A capitalization module 110 is configured to use data captured by module 108 to calculate the market capitalization for each asset, and the capitalization weight for each of the assets as a function of the particular population/subpopulation (Index) within which it resides. One skilled in the art will recognize that market capitalization is a product of the price per share and the number of outstanding shares, and is thus independent of the particular population or sub-population (e.g., Index) within which it resides. The capitalization weight generated by module 110 is a ratio of the market capitalization of the particular asset to the total market capitalization of all assets in the particular population/subpopulation (Index). Thus, once the indexes are identified (e.g., as populated into the table of Example I), the weight of each constituent security (asset) within that index is calculated based on the market value of the asset within that period. In particular embodiments, the market value at the beginning of the period is used. For example, when the period is 1-day (e.g., when calculating a 1-day XSV), the market capitalization value at the beginning of the day is used to calculate the capitalization weight. When the period is one month (e.g., when calculating 1-month XSV), the market capitalization value at the beginning of the month is used. In particular embodiments, the market capitalization value may be populated to tables 44, 45 (FIG. 4A), while the calculated capitalization weighting is populated to the table of Example I, due to its dependency on the other assets within the particular index.

Total return module 112 is configured to generate a total return value for each asset (based on share price and/or value change) and optionally dividend payments and/or currency returns over a particular time period (e.g., daily, monthly, etc.). For example, a 1-month total return may be calculated by compounding each day's total returns in that month. Moreover, in particular embodiments, if a particular market has a holiday, the total return of the securities that are part of that market are set to zero for that holiday. This total return information is independent of the particular indexes, and thus may be populated into tables 44, 45.

XSV index calculation module 114 is configured to calculate, using the capitalization weightings and total returns for each asset, the weighted return dispersion for the index over the predetermined period, to generate a measure of cross-sectional volatility (XSV) for the entire index, to form an XSV Index for each of the Indexes (e.g., of Example I). This XSV calculation is provided using the following Equation 1:

$$XVOL = \sqrt{\sum_i w_i (r_i - R)^2} \qquad \text{Eq. 1}$$

where, $w_i$=the capitalization weight of stock i, (e.g., at the beginning of the period)

$r_i$=the total return of stock i for the period for which XSV is calculated, $$R = \sum_i w_i r_i$$

The XSV Index(es) is a measure of discrepancy in volatility among the assets in the particular index during the period. The XSV Indexes may be correlated to a predetermined scale, and/or expressed as a percentage deviation, such as shown in the Figures as discussed hereinbelow. In particular embodiments, the total return includes price, dividend, and currency returns. Particular embodiments also calculate the capitalization weight at the beginning of the period, and is float-adjusted. These XSV Index calculations may be stored in tables 48, 50 as shown in FIGS. 4B and 4C.

It is noted that the XSV calculations may be provided for substantially any group of investment securities, including any of the populations defined by the aforementioned categories (such as shown in tables 46, 47), and any sub-populations (such as formed by cross-referencing any of those categories).

For example, each population may be selected based on characteristics such as region, country, size, style, sector, total return, market value, and combinations thereof. In various embodiments, specific examples of these characteristics may include Global, Global Ex. U.S., Global Ex. Japan, Developed, Developed Ex. U.S., U.S., Emerging Markets, Small Cap, Mid Cap, Large Cap, Value, Growth, Technology, HealthCare, Consumer Discretionary, Consumer Staples, Energy, Materials & Processing, Producer Durables, Financial Services, Utilities, and combinations thereof.

In particular embodiments, module 114 calculates XSV on a daily basis, for total returns, although other periods, such as weekly or monthly, and/or partial returns may be used without departing from the scope of the present invention. This module 114 may thus generate XSV Indexes corresponding to the 1-day, 1-week, or 1-month, etc., dispersion of (total) returns.

In addition, an optional trailing average XSV module 116 may be configured to generate a trailing average of each XSV Index calculation for a predetermined number of preceding periods. This trailing average may be generated using the historical XSV data from tables 48', 50'. For example, module 116 may generate a 22-day trailing XSV average for each XSV Index using daily XSV Index calculations for the past 22 (trading) days. Those skilled in the art will recognize that trailing averages may be calculated for substantially any number of preceding periods.

Optionally, an asset exclusion module 118 may be configured to exclude assets that either enter or exit the particular index during the period. Moreover, module 118 may optionally re-calculate historical XSV information, e.g., for use by module 116 to generate XSV Index trailing averages. For example, if the XSV Index is calculated on the S&P® 500 Index, and the one of the constituent assets is de-listed partway through the 22-day period, then module 118 may recalculate the historical XSV data to for any of the 22-days prior to the de-listing; to enable module 116 to calculate the 22-day trailing average without the de-listed asset.

The XSV Indexes thus measure the dispersion of return performances of assets (e.g., stocks) within a given market on a given day (or other period). As such, the XSV Indexes provide a measure of whether stocks are moving together or are diverging, to help guide investors and investment managers on the level of active risk (and alpha potential) in a particular market. In this regard, an optional index comparison module 120 may be configured to cross reference the various XSV Index calculations (e.g., of tables 48, 48', 50, 50', FIGS. 4C, 4D) in order to identify specific XSV Indexes which are relatively high (or low) in comparison to other XSV Indexes.

An optional XSV data export module 122 is configured to export the various XSV Index data to users 32, 92 (FIGS. 1, 5), in any convenient manner, such as by using File Transfer Protocol (FTP), page server 12 and/or picture server 14 (FIG. 1). Module 122 may be configured to export the data in substantially any desired format, including raw data, data organized in tabular format such as shown in FIGS. 4C, 4D, and/or in the form of charts and graphs as shown in FIGS. 8-10. For example, historical time series for multiple XSV Indexes may be displayed in a graphical chart format, as shown at 300 of FIG. 8. This approach provides a convenient visual approach for highlighting differences between XSV Indexes. For example, as shown, an XSV Index for the technology sector includes a spike 302 compared to a relatively flat portion 304 of a financial index during the 1999-2000 timeframe. Chart 300 shows that the opposite is true in the 2008-2009 timeframe, in which the financial index spikes at 306, while the technology index is relatively flat at 308. It should be recognized that the amount and/or format of exported XSV Index data may be dependent upon the level of access purchased by the various users 32, 92, etc. For example, tabular formatted data (e.g., of FIGS. 4C, 4D) for various indexes may be provided at relatively low cost (or free) to users via a conventional web browser, while more comprehensive data sets may be provided, such as via FTP, to users paying higher fees.

Turning now to FIGS. 9 and 10, bar chart 340 displays bars 342 corresponding to monthly averages for XSV Indexes of various styles. Superposed with each bar 342 are lines 344 having endpoints corresponding to the 5th and 95th percentiles of monthly XSV over the prior 10 years, with a hash mark corresponding the 50 percentile. Chart 350 of FIG. 10 is similar to chart 340, though illustrating monthly XSV performance for various sectors instead of styles. These charts 340 and 350 provide a convenient approach for cross-referencing various XSV Indexes to highlight differences based on both category (e.g., style, sector, etc.) and time. For example, in chart 350 of FIG. 10, the bars represent XSV Indexes for various sectors for the month of April, 2010. It can be seen that the current (April) XSV levels are below the prior 10 year median, except for Energy, which is above median (e.g., due to the oil spill in the Gulf of Mexico which created some performance differences in that sector).

Figure 7:
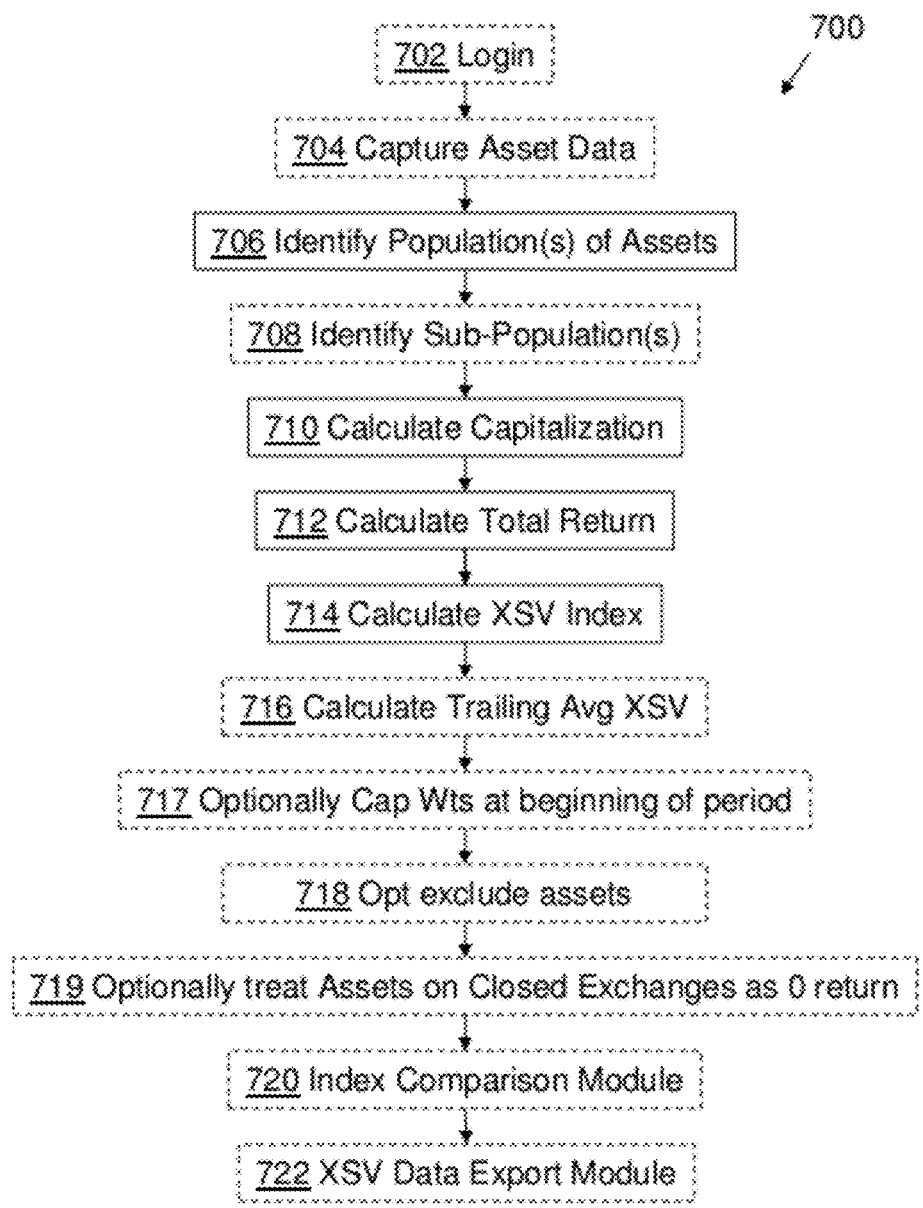
FIG. 7 is a flow chart of one embodiment for an XSV method of the present invention, with optional aspects shown in phantom.

A method for automated XSV Index generation in a client-server environment, using a network-based transaction facility, such as the XSV calculation facility 10, will now be described as illustrated by the flow chart of FIG. 7. As shown, method 700 optionally commences with communicating 702 user interface information to a user of the transaction facility at client 32 (FIG. 1). More specifically, the user interface information may provide a login interface via login module 102, described above with reference to FIG. 6. Subsequent to the login by the user, at 704 the system optionally captures data for substantially any number of assets, using data capture module 104. At 706, one or more populations of the assets are identified, e.g., using security ID module 106 to form Index(es). Optionally, sub-populations of the assets are identified at 708, using module 108. At 710, the system calculates the capitalization of the assets in the indexes, using the data captured at 704. The total returns for the assets are calculated at 712, using module 112. The XSV for each identified index is calculated at 714, to form XSV Indexes. The trailing average of each XSV Index is optionally calculated at 716. Optionally, the capitalization weights used in steps 714 and 716 may be calculated at the beginning of the applicable period, at 717. Optionally, particular assets may be excluded 718 from the foregoing XSV calculations, such as those assets that entered or exited the underlying indexes during the period for which the XSV Index or its trailing average was calculated. Similarly, at 719, assets trading on exchanges that are closed, e.g., due to local holidays, etc., may be treated as having returns of zero for those days. At 720, the various XSV Indexes are optionally compared or otherwise cross-referenced to one another as discussed hereinabove. Data relating to the above-described XSV Indexes, trailing averages, and/or cross-referencing, may be optionally exported at 722, in various formats including the tables, charts, and graphs of FIGS. 4C, 4D, and 8-10.

In summary, it will be appreciated that the above described embodiments provide a convenient vehicle for XSV Index generation, comparison/aggregation, and export, in a substantially real-time, environment using a seamlessly integrated transaction facility.

Figure 11:
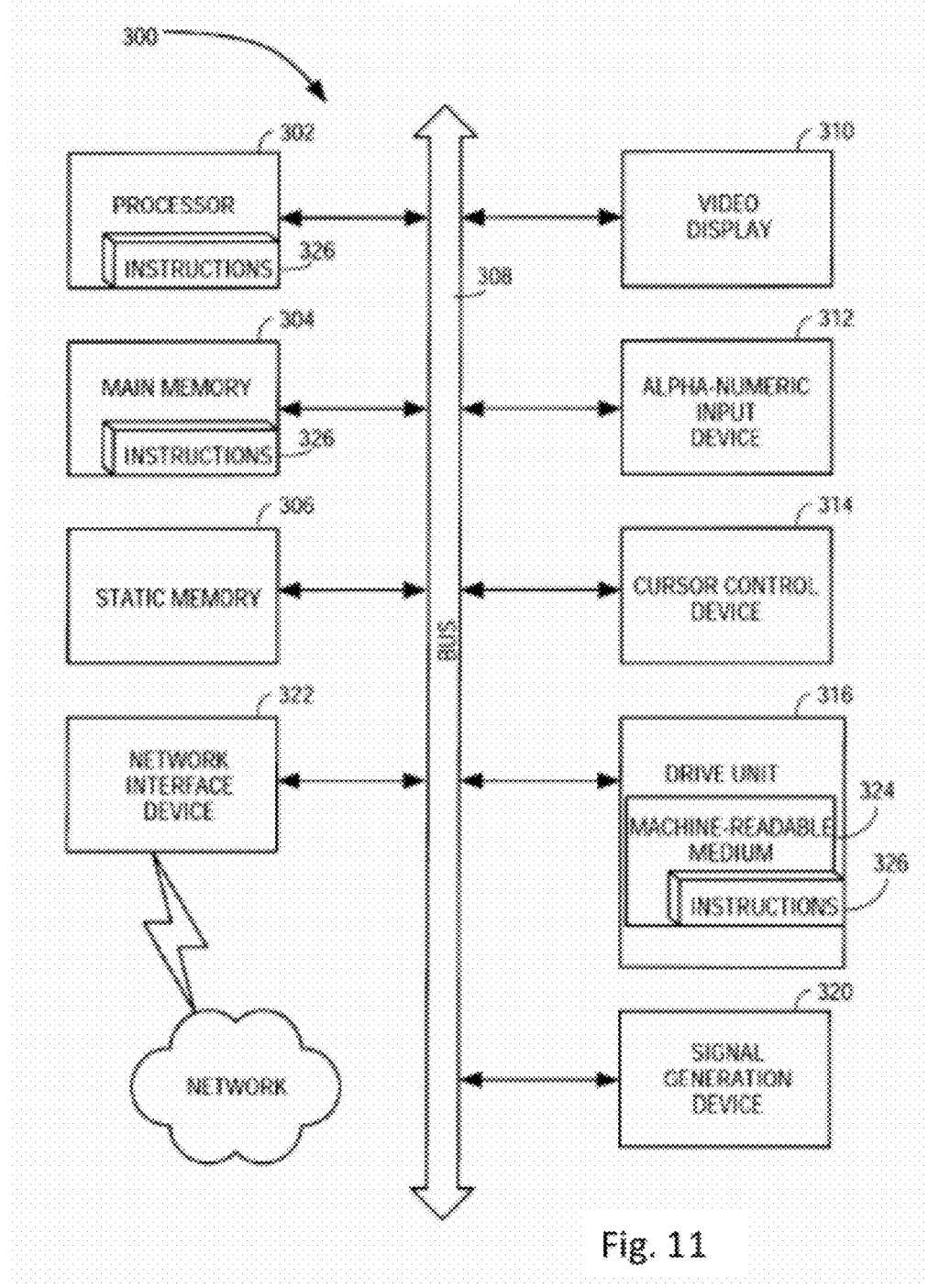
FIG. 11 is a block diagram of one embodiment of a computer system usable with embodiments of the present invention.

FIG. 11 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Thus, a method and apparatus for generating XSV Indexes and cross-referenced output in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Furthermore, embodiments of the present invention include a computer program code-based product, which includes a computer readable storage medium having program code stored therein which can be used to instruct a computer to perform any of the functions, methods and/or modules associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g., Internet, WWW, wireless web). programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

The following illustrative example demonstrates certain aspects and embodiments of the present invention, and are not intended to limit the present invention to any one particular embodiment or set of features.

Example I

Representative XSV Indexes

| | | | |
|---|---|---|---|
| US | Global Mid Cap. Value | Global Ex. Japan Growth | Developed Ex. US Materials&Processing |
| US Technology | Global Mid Cap. Growth | Global Ex. Japan Small Cap. | Developed Ex. US ProducerDurables |
| US HealthCare | Global Large Cap. | Global Ex. Japan Small Cap. Value | Developed Ex. US FinancialServices |
| US ConsumerDiscretionary | Global Large Cap. Value | Global Ex. Japan Small Cap. Growth | Developed Ex. US Utilities |
| US ConsumerStaples | Global Large Cap. Growth | Global Ex. Japan Mid Cap. | Developed Ex. US Value |
| US Energy | Global Ex. US | Global Ex. Japan Mid Cap. Value | Developed Ex. US Growth |
| US Materials&Processing | Global Ex. US Technology | Global Ex. Japan Mid Cap. Growth | Developed Ex. US Small Cap. |
| US ProducerDurables | Global Ex. US HealthCare | Global Ex. Japan Large Cap. | Developed Ex. US Small Cap. Value |
| US FinancialServices | Global Ex. US ConsumerDiscretionary | Global Ex. Japan Large Cap. Value | Developed Ex. US Small Cap. Growth |
| US Utilities | Global Ex. US ConsumerStaples | Global Ex. Japan Large Cap. Growth | Developed Ex. US Mid Cap. |
| US Value | Global Ex. US Energy | Developed | Developed Ex. US Mid Cap. Value |
| US Growth | Global Ex. US Materials&Processing | Developed Technology | Developed Ex. US Mid Cap. Growth |
| US Small Cap. | Global Ex. US ProducerDurables | Developed HealthCare | Developed Ex. US Large Cap. |
| US Small Cap. Value | Global Ex. US FinancialServices | Developed ConsumerDiscretionary | Developed Ex. US Large Cap. Value |
| US Small Cap. Growth | Global Ex. US Utilities | Developed ConsumerStaples | Developed Ex. US Large Cap. Growth |
| US Mid Cap. | Global Ex. US Value | Developed Energy | Emerging Markets |
| US Mid Cap. Value | Global Ex. US Growth | Developed Materials&Processing | Emerging Markets Technology |
| US Mid Cap. Growth | Global Ex. US Small Cap. | Developed ProducerDurables | Emerging Markets HealthCare |
| US Large Cap. | Global Ex. US Small Cap. Value | Developed FinancialServices | Emerging Markets ConsumerDiscretionary |
| US Large Cap. Value | Global Ex. US Small Cap. Growth | Developed Utilities | Emerging Markets ConsumerStaples |
| US Large Cap. Growth | Global Ex. US Mid Cap. | Developed Value | Emerging Markets Energy |
| Global | Global Ex. US Mid Cap. Value | Developed Growth | Emerging Markets Materials&Processing |
| Global Technology | Global Ex. US Mid Cap. Growth | Developed Small Cap. | Emerging Markets ProducerDurables |
| Global HealthCare | Global Ex. US Large Cap. | Developed Small Cap. Value | Emerging Markets FinancialServices |
| Global ConsumerDiscretionary | Global Ex. US Large Cap. Value | Developed Small Cap. Growth | Emerging Markets Utilities |
| Global ConsumerStaples | Global Ex. US Large Cap. Growth | Developed Mid Cap. | Emerging Markets Value |
| Global Energy | Global Ex. Japan | Developed Mid Cap. Value | Emerging Markets Growth |
| Global Materials&Processing | Global Ex. Japan Technology | Developed Mid Cap. Growth | Emerging Markets Small Cap. |
| Global ProducerDurables | Global Ex. Japan HealthCare | Developed Large Cap. | Emerging Markets Small Cap. Value |
| Global FinancialServices | Global Ex. Japan ConsumerDiscretionary | Developed Large Cap. Value | Emerging Markets Small Cap. Growth |
| Global Utilities | Global Ex. Japan ConsumerStaples | Developed Large Cap. Growth | Emerging Markets Mid Cap. |
| Global Value | Global Ex. Japan Energy | Developed Ex. US | Emerging Markets Mid Cap. Value |
| Global Growth | Global Ex. Japan Materials&Processing | Developed Ex. US Technology | Emerging Markets Mid Cap. Growth |
| Global Small Cap. | Global Ex. Japan ProducerDurables | Developed Ex. US HealthCare | Emerging Markets Large Cap. |
| Global Small Cap. Value | Global Ex. Japan FinancialServices | Developed Ex. US ConsumerDiscretionary | Emerging Markets Large Cap. Value |
| Global Small Cap. Growth | Global Ex. Japan Utilities | Developed Ex. US ConsumerStaples | Emerging Markets Large Cap. Growth |
| Global Mid Cap. | Global Ex. Japan Value | Developed Ex. US Energy | |

Having thus describe the invention, what is claimed is:

The invention claimed is:
1. A computer implemented method of generating a cross-sectional volatility index, the method comprising:
   (a) identifying a population of assets having predetermined characteristics to form an index;
   (b) capturing, with at least one processor, market capitalization data for each of the assets in the index;
   (c) weighting, with the at least one processor, each asset in the index according to its market capitalization;
   (d) capturing, with the at least one processor, returns for each asset over a predetermined period;
   (e) calculating, with the at least one processor, using the weightings and the returns for each asset, the weighted return dispersion for the index over the predetermined period, to form an XSV Index, using the formula:

$$XSV = \sqrt{\sum_i w_i(r_i - R)^2}$$

Where,
$w_i$=the capitalization weight of stock i,
$r_i$=the total return of stock i for the period for which XSV is calculated, $$R = \sum_i w_i r_i$$

wherein the XSV Index is a measure of discrepancy in volatility among the assets in the index during the period.

2. The method of claim 1, wherein the population of assets comprises substantially any group of investment securities.

3. The method of claim 1, further comprising (f) repeating said (a) –(e) for sub- populations of assets within the population of assets, having other predetermined characteristics, to generate another XSV Index for each of the sub-populations.

4. The method of claim 3, wherein each sub-population may be selected based on other predetermined characteristics selected from the group consisting of region, country, size, style, sector, total return, market value, and combinations thereof.

5. The method of claim 4, wherein the predetermined characteristics are selected from the group consisting of Global, Global Ex. U.S., Global Ex. Japan, Developed, Developed Ex. U.S., U.S., Emerging Markets, Small Cap, Mid Cap, Large Cap, Value, Growth, Technology, HealthCare, Consumer Discretionary, Consumer Staples, Energy, Materials & Processing, Producer Durables, Financial Services, Utilities, and combinations thereof.

6. The method of claim 3, further comprising (g) comparing the other XSV Indexes to identify sub-populations of assets having relatively high XSV .

7. The method of claim 1, wherein $w_i$=the capitalization weight of stock i, at the beginning of the period.

8. The method of claim 7, wherein $w_i$ is float-adjusted.

9. The method of claim 1, comprising excluding from the calculating (e), assets that were added to or deleted from each index during the period.

10. The method of claim 1, wherein the period is daily.

11. The method of claim 1, wherein the period is monthly.

12. The method of claim 1, further comprising generating a trailing average of each XSV Index for a predetermined number of preceding periods.

13. The method of claim 12, wherein the period is a day and the predetermined number of periods is at least 22.

14. The method of claim 13, wherein the predetermined number of days is a month.

15. The method of claim 12, comprising excluding from the trailing average of each XSV Index, assets that were added to or deleted from each index during the predetermined number of preceding days.

16. The method of claim 15, wherein said excluding comprises recalculating each XSV Index for each of the predetermined number of preceding days, for each index having the assets that were added to or deleted therefrom.

17. The method of claim 12, wherein said capturing (d) comprises using a daily return of zero for each asset that was not traded on a particular day.

18. The method of claim 1, wherein said identifying (a) comprises identifying a population of assets having predetermined characteristics selected from the group of: the largest-capitalization stocks trading on a predetermined Stock Exchange; a predetermined index; the S&P 500® index, the Russell 2000® index, the FTSE 100 Index, the EURO STOXX 50 Index, the Nikkei 225 Index, and combinations thereof.

19. The method of claim 1, wherein said capturing (d) comprises capturing daily returns based on at least one of a percentage price change and value change basis.

20. The method of claim 19, wherein said capturing (d) further comprises capturing dividend yields for each of the assets.

21. The method of claim 20, wherein said capturing (d) further comprises capturing currency returns for each of the assets.

22. The method of claim 1, wherein said calculating (e) comprises correlating the measure of XSV to a predetermined scale.

23. The method of claim 22, wherein said calculating (e) comprises correlating the measure of XSV as a percentage deviation.

24. A computer-implemented system for generating a cross-sectional volatility index, the system comprising:
   at least one computer using a population identification (ID) module to identify a population of assets having predetermined characteristics to form an index;
   the at least one computer using a capitalization module to capture market capitalization data for each of the assets in the index;
   the capitalization module configured to weight each asset in the index according to its market capitalization;
   the at least one computer using a return module to capture returns for each asset over a predetermined period;
   the at least one computer using a cross-sectional volatility (XSV) module to calculate the weighted return dispersion for the index over the predetermined period, using the weightings and the returns for each asset, to generate an XSV Index, using the formula:

$$XSV = \sqrt{\sum_i w_i(r_i - R)^2}$$

Where,
$w_i$ = the capitalization weight of stock i,
$r_i$ = the total return of stock i for the period for which XSV is calculated, $$R = \sum_i w_i r_i$$

wherein the XSV Index is a measure of discrepancy in volatility among the assets in the index during the period.

25. The system of claim 24, further comprising a sub-population module configured to identify sub-populations of assets within the population of assets, having other predetermined characteristics, wherein the XSV module is configured to generate another XSV Index for each of the sub-populations.

26. The system of claim 25, wherein the sub-population module is configured to select each sub-population based on other predetermined characteristics selected from the group consisting of region, country, size, style, sector, total return, market value, and combinations thereof.

27. The system of claim 25, further comprising an index comparison module configured to compare the other XSV Indexes to identify sub-populations of assets having relatively high XSV.

28. The system of claim 24, wherein the XSV module is configured to use the capitalization weight of stock i, at the beginning of the period, for $w_i$.

29. The system of claim 28, wherein the XSV module is configured to float-adjust $w_i$.

30. The system of claim 24, comprising an asset exclusion module configured to exclude from calculations performed by the XSV module, assets that were added to or deleted from each index during the period.

31. The system of claim 24, further comprising a trailing average module configured to generate a trailing average of each XSV Index for a predetermined number of preceding periods.

32. The system of claim 31, wherein the trailing average module is configured to use a day as the period and the predetermined number of periods is at least 22.

33. The system of claim 32, further comprising an asset exclusion module configured to exclude from the trailing average of each XSV Index, assets that were added to or deleted from each index during the predetermined number of preceding days.

34. The system of claim 33, wherein the XSV module is configured to recalculate each XSV Index for each of the predetermined number of preceding days, for each index having the assets that were added to or deleted therefrom.

35. The system of claim 24, wherein the population ID module is configured to identify a population of assets having predetermined characteristics selected from the group of: the largest-capitalization stocks trading on a predetermined Stock Exchange; a predetermined index; the S&P 500® index, the Russell 2000® index, the FTSE 100 Index, the EURO STOXX 50 Index, the Nikkei 225 Index, and combinations thereof.

36. The system of claim 24, wherein the return module is configured to capture daily returns based on at least one of a percentage price change and value change basis.

37. The system of claim 36, wherein the return module is configured to capture dividend yields for each of the assets.

38. The system of claim 37, wherein the return module is configured to capture currency returns for each of the assets.

39. The system of claim 24, wherein the XSV module is configured to correlate the measure of XSV to a predetermined scale.

40. The system of claim 39, wherein the XSV module is configured to correlate the measure of XSV as a percentage deviation.

41. An article of manufacture for generating a cross-sectional volatility index, said article of manufacture comprising a computer usable medium having an executable computer readable program code embodied therein, said computer readable program code configured for:

identifying a population of assets having predetermined characteristics to form an index;

capturing market capitalization data for each of the assets in the index;

weighting each asset in the index according to its market capitalization;

capturing returns for each asset over a predetermined period; and calculating, using the weightings and the returns for each asset, the weighted return dispersion for the index over the predetermined period, to form an XSV Index, using the formula:

$$XSV = \sqrt{\sum_i w_i (r_i - R)^2}$$

Where,
$w_i$ = the capitalization weight of stock i,
$r_i$ = the total return of stock i for the period for which XSV is calculated, $$R = \sum_i w_i r_i$$

wherein the XSV Index is a measure of discrepancy in volatility among the assets in the index during the period.

* * * * *